United States Patent Office 3,091,766
Patented May 28, 1963

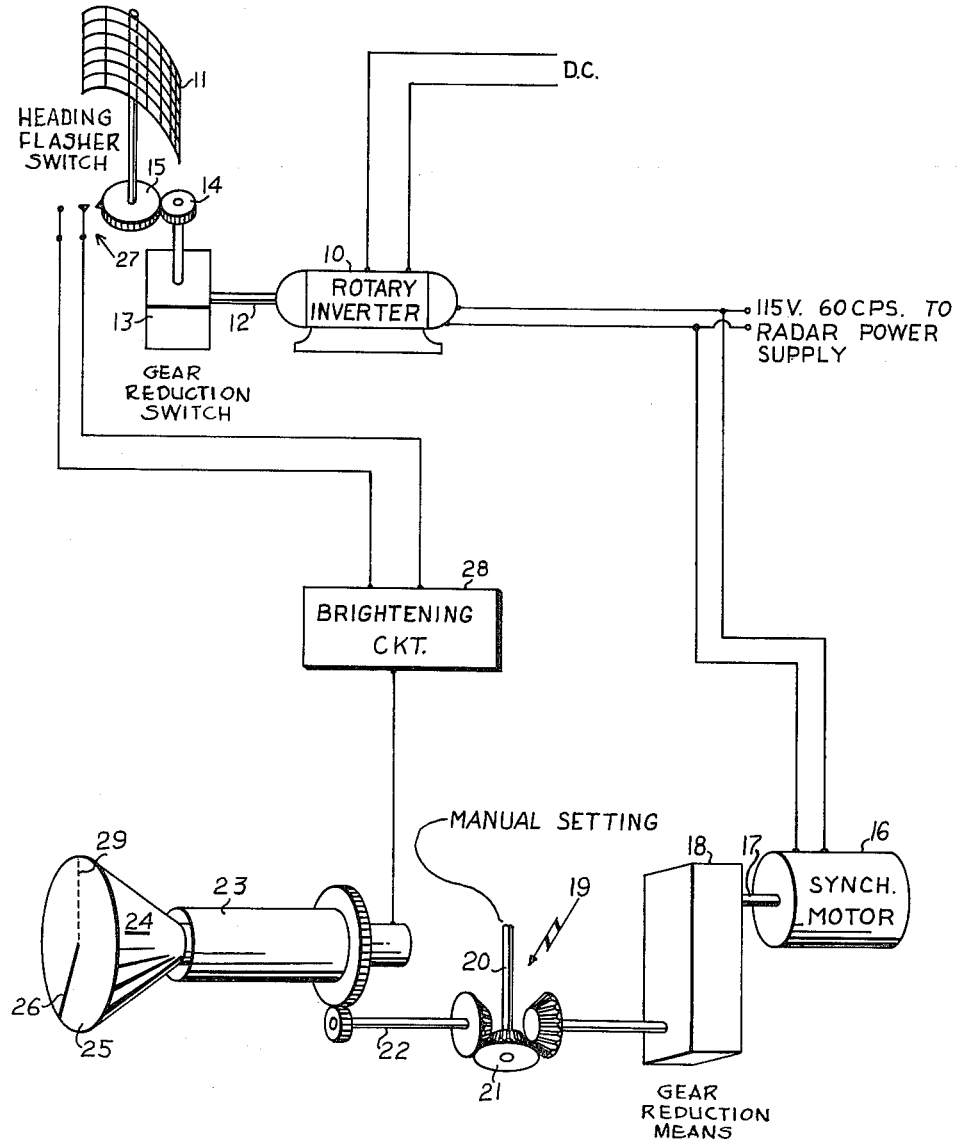

3,091,766
ANTENNA AZIMUTH TRANSMISSION SYSTEMS
Robert A. Fryklund, Dedham, Mass., assignor to Raytheon Company, Lexington, Mass., a corporation of Delaware
Filed Jan. 12, 1960, Ser. No. 1,929
9 Claims. (Cl. 343—118)

The present invention relates to antenna azimuth transmission systems and more particularly to simplified radar antenna azimuth transmission systems for small craft installations where direct current is the main source of electrical power.

The antenna azimuth transmission systems used in most radars are separate and self-contained systems involving synchros, gears, servo systems, complex electronic circuits and the like that account for a large part of production costs.

It is the principal object of the present invention to dispense with the requirement of a separate and expensize azimuth system thereby reducing product cost to a minimum while still providing a simple, dependable, and trouble-free antenna azimuth transmission system.

As pointed out hereinabove, most radars have a separate azimuth transmission system whether ship borne or not. Further, a rotary inverter for converting D.C. power to 60 cycle A.C. power is usually found somewhere in a radar installation and especially in small craft installations where D.C. power is quite prevalent if not the exclusive source of electrical power. In accordance with the present invention a rotary inverter mounted in the antenna pedestal is utilized to supply A.C. power for the receiver and transmitter portions of the system and to concomitantly drive the antenna through gear speed reducer means. In this manner the inverter functions not only as an electric power converter but as the antenna drive motor as well. If the inverter has a rotational speed of, for example, 3600 r.p.m. and supplies 115 volts at 60 cycles per second, a gear reduction of 180:1 may be used to rotate the antenna at 20 r.p.m. The A.C. power from the inverter is supplied to the balance of the radar installation in a conventional manner and a small portion thereof is utilized to drive a synchronous motor, for example, of the instrument type having a rotational speed of 1800 r.p.m. A deflection coil rotatably mounted on a cathode ray tube is driven by the synchronous motor through gear speed reducer means and a mechanical (spur-gear) differential with a manual control brought out to the front panel for positioning the ship's heading flasher. If gear speed reducer means for the synchronous motor has a ratio of 90:1 the deflection coil will be driven at 20 r.p.m. Since the deflection coil of the display system will be in step with but at some random angular position relative to the antenna a manual control is provided to correct the aforementioned random angle until the ship's heading flasher is at zero degrees relative on the face of the cathode ray tube, which is to say synchronize the sweep in azimuth with the antenna.

Other objects and many of the attendant advantages of the present invention will be readily appreciated as the same becomes better understood by reference to the following detailed description when considered in conjunction with the single FIGURE of the drawing which shows diagrammatically one embodiment of the invention.

With reference now to the drawing there is shown a rotary inverter 10 driving a rotatable antenna 11 through a shaft 12 connected to the armature of the inverter, gear speed reduction means 13 and a gear train comprised of gears 14—15. The rotary inverter 10 may be actuated by direct current from any suitable source (not shown) and supplies alternating current to the radar power supply and to a synchronous motor 16. The rotary inverter 10 may, for example, be actuated by 32 volts D.C. and supply 115 volts at 60 cycles per second. If the rotary inverter 10 has a rotational speed of, for example, 3600 r.p.m. and an over-all gear reduction of 180:1 is provided by gear speed reduction means 13 and gears 14 and 15, the antenna 11 will be rotated through 360 degrees at 20 r.p.m.

The shaft 17 of the synchronous motor 16 is connected to gear reduction means 18 which in turn drives a mechanical differential 19 having a shaft 20 attached to the center gear 21 for manual control more fully discussed hereinafter. The differential 19, in turn, through shaft 22 and a suitable gear train drives a deflection coil 23 rotatably carried on a cathode ray tube 24 for providing in conventional manner a plan position indication display on the face 25 of the cathode ray tube 24. Means to indicate ship heading and/or permit synchronization and coordination of the sweep 26 on the face 25 of the cathode ray tube 24 with antenna position comprises a ship's heading flasher switch 27 actuated by the antenna 11 when the antenna is in alignment with a desired reference direction such as, for example, a ship's keel. The ship's heading flasher switch 27 actuates a conventional brightening circuit 28 which causes the sweep 26 to become brighter when the switch 27 is closed. Rotation of the deflection coil 23 produces the PPI sweep in conventional manner.

As pointed out hereinabove a portion of the A.C. output from the rotary inverter 10 drives a synchronous motor 16 which may be, for example, a small instrument type synchronous motor having a rotational speed of 1800 r.p.m. In this case the gear speed reduction means 18 and the deflection coil gear train may have an over-all gear reduction ratio of 90:1 to provide a 20 r.p.m. drive for the deflection coil to correspond with that of the antenna 11.

When the radar system is first turned on, which is to say current is supplied to the rotary inverter 10, the synchronous motor 16 will pull into step with the rotary inverter at some random angular position relative to the position of the antenna. By adjustment of the shaft 20 the differential 19 permits correction of this angular position until the ship's heading flasher is at the zero degree relative position which is normally at the top of the face of the cathode ray tube 24. The shaft 20 may be adjusted by means of a control (not shown) on the control panel which is calibrated in degrees from zero to 360 degrees. When the radar is turned on, the random angular position of the deflection coil 23 relative to the position of the antenna 11 may be noted on a relative bearing scale provided on the cathode ray tube bezel. For example, the ship's heading flasher might appear at 190 degrees. The control which would be operationally connected to shaft 20 is then turned to 190 degrees thereby adjusting the deflection coil by the proper amount and in the proper direction. The ship's heading flasher will now appear at the desired zero degree position indicated by the broken line 29. From the preceding discussion it may now be obvious that the present invention provides a very simple, dependable, and trouble-free antenna azimuth transmission system that may be manufactured at a substantial reduction in cost over prior art systems. Further, in view of the mechanical aspects of the system it may be obvious that many modifications may be made by those experienced in the art without departing from the spirit and scope of the invention. For example, other suitable systems for transmitting power to the antenna and the deflection coil may be utilized and other means for adjusting the sweep may be used. For example, the differential may be omitted and the shell of the synchronous motor may be rotated relative to its armature to attain the same end result. Obviously, the manual adjustment described by way of example hereinabove may be performed automatically if desired by the application of well-known principles and apparatus.

While the present invention has been described in its preferred embodiment it is realized that modifications may be made, and it is desired that it be understood that no limitations on the invention are intended other than may be imposed by the scope of the appended claims.

Having now disclosed my invention, what I claim as new and desire to secure by Letters Patent of the United States is:

1. In an antenna azimuth drive system the combination comprising: a rotatable antenna; means for driving said antenna having alternating current output means; display means including a cathode ray tube and deflection means; means including a synchronous motor connected to said output means for rotatably driving said deflection means; and means for angularly adjusting the position of said deflection means.

2. In an antenna azimuth drive system the combination comprising: a rotatable antenna; means for driving said antenna having alternating current output means; display means including a cathode ray tube and a rotatable deflection coil carried on said tube; means including a synchronous motor connected to said output means for rotatably driving said deflection coil; and means for angularly adjusting the position of said deflection coil with respect to said antenna.

3. In an antenna azimuth drive system the combination comprising: a rotatable antenna; driving means connected to said antenna having alternating current output means; display means including a cathode ray tube and a rotatable deflection coil carried on said tube for providing a plan-position display; means including a synchronous motor electrically connected to said output means and mechanically connected to said coil for rotatably driving said deflection coil; and means for angularly adjusting the position of said deflection coil whereby a selected position of said coil corresponds to a selected position of said antenna.

4. In an antenna azimuth drive system the combination comprising: a rotatable antenna; driving means comprising a rotatory inverter connected to said antenna and having alternating current output means; display means including a cathode ray tube and a rotatable deflection coil carried on said tube for providing a plan-position sweep display; means including a synchronous motor electrically connected to said output means and mechanically connected to said coil for rotatably driving said deflection coil in synchronism with said antenna; and means for angularly adjusting the position of said deflection coil whereby a selected position of said coil corresponds to a selected position of said antenna.

5. In an antenna azimuth drive system the combination comprising: a rotatable antenna; driving means comprising a rotatory inverter having alternating current output means and mechanically connected to said antenna for rotating said antenna at a predetermined rate; display means including a cathode ray tube and a rotatable deflection coil carried on said tube for providing a plan-position sweep display; means including a synchronous motor electrically connected to said output means and mechanically connected to said coil for rotatably driving same at the said rate of said antenna; and means for selectably adjusting the angular position of said deflection coil whereby a selected position of said coil corresponds to a selected position of said antenna.

6. In an antenna azimuth drive system the combination comprising: a rotatable antenna; driving means comprising a rotatory inverter having alternating current output means and mechanically connected to said antenna for rotating said antenna at a predetermined rate; display means including a cathode ray tube and a rotatable deflection coil carried on said tube for providing a plan-position sweep display; means including a synchronous motor electrically connected to said output means and mechanically connected to said coil for rotatably driving same at the said rate of said antenna; means for varying the intensity of said sweep when said antenna is in a selected position; and means for selectably adjusting the angular position of said deflection coil whereby a selected position of said coil corresponds to said selected position of said antenna.

7. In a drive system the combination comprising: first rotatable means; second means for driving said first means having alternating current output means; third rotatable means; a synchronous motor connected to said output means for driving said third means; and fourth means coupled between said synchronous motor and said third means for angularly adjusting the position of said third means.

8. In a drive system the combination comprising: first rotatable means; second means including a rotatory inverter for driving said first means having alternating current output means; third rotatable means; a synchronous motor electrically connected to said output means and mechanically connected to said third means for driving said third means; and fourth means coupled between said synchronous motor and said third means for angularly adjusting the position of said third means with respect to said first means.

9. In a drive system the combination comprising: first rotatable means; driving means including a rotatory inverter for driving said first means at a predetermined rate having alternating current output means for simultaneously generating an alternating current; display means including second rotatable means for displaying the position of said first means; a synchronous motor electrically connected to said output means and mechanically connected to said second means for driving said second means at the same rate as said first means; and third means coupled between said synchronous motor and said second means for selectably adjusting the angular position of said second means whereby a selected position of said second means corresponds to a selected position of said first means.

References Cited in the file of this patent

UNITED STATES PATENTS

| | | |
|---|---|---|
| 1,820,647 | Brown | Aug. 25, 1931 |
| 2,688,130 | Whitaker et al. | Aug. 31, 1954 |
| 2,731,633 | O'Kane et al. | Jan. 17, 1956 |
| 2,742,637 | Braddon et al. | Apr. 17, 1956 |
| 2,825,901 | Chapman | Mar. 4, 1958 |
| 2,871,476 | Busignies | Jan. 27, 1959 |
| 2,941,199 | Cutler et al. | June 14, 1960 |